June 10, 1952 J. F. KETTERER 2,599,560
METHOD OF AND APPARATUS FOR ARRANGING THE PARTS OF A LIQUID
DISPENSING SYSTEM FOR DETERMINING THE AMOUNT OF LIQUID
WITHDRAWN THEREFROM
Filed Feb. 13, 1946
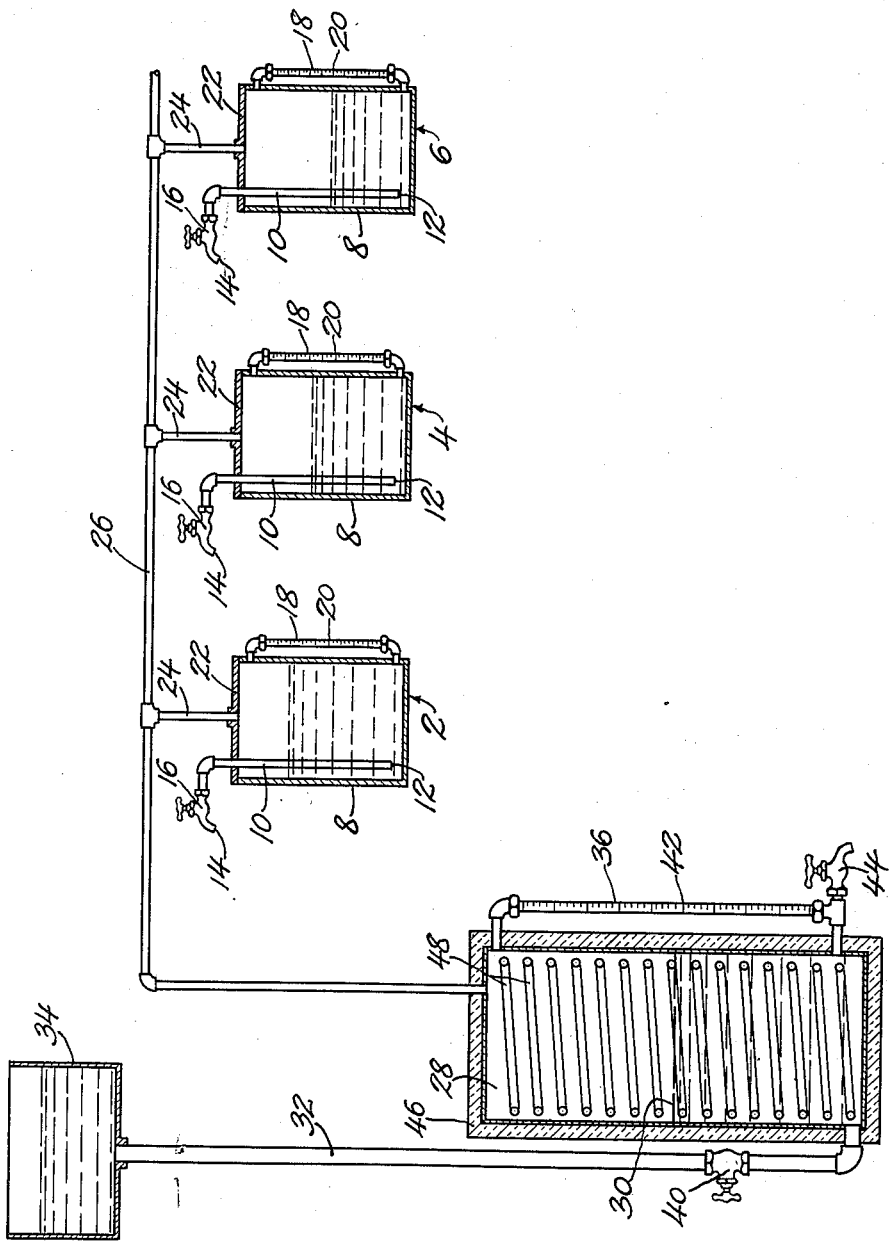
INVENTOR.
JOSEPH F. KETTERER
BY
*Albert Sperry*
ATTORNEY

UNITED STATES PATENT OFFICE 2,599,560

METHOD OF AND APPARATUS FOR ARRANGING THE PARTS OF A LIQUID DISPENSING SYSTEM FOR DETERMINING THE AMOUNT OF LIQUID WITHDRAWN THEREFROM

Joseph F. Ketterer, Trenton, N. J.

Application February 13, 1946, Serial No. 647,329

2 Claims. (Cl. 222—1)

My invention relates to systems for the distribution of liquids and in particular to systems whereby the amount of liquid distributed may be accurately determined.

In many systems, such as those used for dispensing beverages, fuels and lubricants, a number of dispensing outlets are provided. However, when different liquids such as beverages are dispensed, such systems do not generally have any means whatever for indicating the total amount of the various liquids delivered. On the other hand mechanism used to indicate the total amount of a liquid such as gasoline, which is delivered from a number of pumps, has been complicated and expensive.

In accordance with my invention these objections and limitations of prior liquid dispensing systems are overcome and measuring means are provided which are simple and economical to produce and operate and yet they afford an accurate indication of the total amount of liquid dispensed from the system. At the same time the amount of liquid dispensed from each outlet may also be indicated if desired.

These advantages are attained by employing elements wherein a fluid, such as air or a liquid other than that being dispensed, is confined within the system but communicates with each chamber from which liquid is to be dispensed. The confined fluid is placed under pressure by means of a measuring liquid or fluid and therefore as liquid is dispensed from the system the confined fluid is displaced to occupy the space of the dispensed liquid while the measuring liquid or fluid moves to give an accurate indication of the total liquid removed from the system. The position of the confined fluid in each chamber may also be used to indicate the amount of liquid dispensed from any particular chamber. In the preferred form of my invention the system contains two fluids such as a liquid and a gas with the gas trapped between the liquid to be dispensed and the liquid which serves as the measuring means. In this way there is no possibility of intermingling of two liquids in the system and sharp measuring surfaces are presented for measuring or indicating purposes.

One of the objects of my invention is to provide novel and economical means for providing an indication of the amount of liquid dispensed from a system.

Another object of my invention is to provide novel means for affording an indication of the total amount of liquid dispensed from all or any one of a number of outlets.

A further object of my invention is to provide indicating means for a liquid dispensing system wherein a fluid trapped in the system is utilized to indicate the amount of liquid discharged from the system.

These and other objects and features of my invention will appear from the following description thereof in which reference is made to the figure of the accompanying drawing.

The single figure of the drawing is a diagrammatic view in elevation of a typical liquid dispensing system embodying my invention.

In the system illustrated a plurality of dispensing devices 2, 4 and 6 are provided, each of which includes a container 8 with a discharge tube 10 the inner end 12 of which is located near the bottom of the container 8 while the outer end 14 of the tube serves as a discharge outlet. Flow of liquid from the container 8 to the outlet 14 is controlled by valve means 16. Each container may be provided with a sight glass 18 which communicates at its upper and lower ends with the upper and lower portions of the container to indicate the level of the liquid therein. The sight glasses may also be graduated as indicated at 20 to permit the amount of liquid in the container to be measured so that the amount discharged can be determined by comparison with a previous reading.

The top of each container 8 is closed by a cover 22 through which a pressure applying pipe or conduit 24 extends. The conduits 24 are connected to a common header 26 or otherwise communicate with a chamber 28 containing a measuring liquid 30. This liquid is supplied to chamber 28 through a pipe 32 connected to the elevated liquid reservoir 34 or to any other source of liquid under pressure.

The air within the upper portion of the chamber 28 and the air within the header 26 and conduits 24 combines with the air above the liquid in the chambers 8 to constitute a body of fluid which is trapped between the liquid in the chamber 28 and that in the individual chambers 8. The pressure of liquid supplied from the reservoir 34 or other source under pressure is thus applied to the trapped body of air and through it is applied to the liquid in the containers 8. Therefore on opening the valve 16 connected to any one of the containers 8 the liquid in that container will be discharged under the pressure of the liquid supplied to chamber 28. However, the trapped air in the system will prevent any mingling of the measuring liquid supplied to chamber 28 with the liquid being dispensed from containers 8. Since the air from chamber 28 displaces the liquid in containers 8, the measuring liquid supplied to chamber 28 takes the place of the air passing to the containers and therefore, the amount of measuring liquid supplied to the chamber 28 equals the total amount of liquid discharged from the system.

In accordance with my invention chamber 28 is provided with indicating or measuring means which as shown are in the form of a sight glass 36 connected to the chamber near the upper and lower portions thereof so that the measuring liquid will rise in the sight glass to the level of the liquid in the chamber. In this way the amount of liquid drawn from the containers 8 will be indicated by a rise in the level of the liquid in sight glass 36 and the amount of liquid discharged between successive readings of the sight glass can be readily determined.

In practice, when used in a beverage dispensing system for example, each of the containers 8 may be charged with a different beverage such as a different brand or type of beer. The containers 8 may in fact be conventional beer kegs which may be connected or disconnected from the system by means of conventional connections. The liquid supplied to chamber 28 may be water from the city supply line or from any other source of fluid under pressure, and if desired a control valve 40 may be inserted in the water inlet 32 to insure the maintenance of a substantially constant pressure within the system. The amount of water initially contained in the chamber 28 when the containers 8 are full should be high enough to appear in the sight glass 36. Thereafter, the level of the liquid in sight glass 36 can be observed every day or every hour or at other convenient times as desired. By comparing the levels thus observed the total amount of liquid dispensed from the system can be readily determined or the sight glass may be graduated as indicated at 42 to indicate the total amount of liquid discharged. At the same time the sight glasses 18 on the containers 8 may be observed to indicate the level of liquid therein and the amount of liquid discharged from any particular container.

In recharging the system the control valve 40 is turned to cut off the flow of liquid from the reservoir 34 to the chamber 28 and the covers are removed from containers 8 to recharge the containers. At the same time, the level of liquid in chamber 28 is lowered by draining it off from the drain tap 44 until it has fallen to a zero or other marking on the sight glass 36. The covers are then replaced on containers 8 and the control valve 40 is opened to place the system in operation again.

When using a system of the character described it is possible to employ a trapped fluid other than air and therefore in dispensing gasoline for example, the trapped fluid may be water and pressure may be applied thereto by air or another liquid. The pipes or conduits 24 and 32 may be connected to the containers 8 and chamber 28 in any desired manner. Similarly, my invention may be used in dispensing liquids to various vats in industrial plants or for dispensing any desired liquid. It will also be apparent that any suitable or preferred form of liquid level responsive means may be employed in place of the sight glasses illustrated.

When the confined fluid is a gas it is generally desirable to maintain it at a substantially constant temperature in order to avoid variations in the operation of the indicating means due to expansion or contraction of the gas with changes in temperature of the atmosphere or surroundings of the chamber 28 and conduits 24. For this purpose the chamber and conduits may be insulated as shown at 46 and if desired a coil 48 is supplied with brine or any other temperature controlling medium for maintaining the measuring liquid and air or gas confined in the system at a constant or predetermined temperature. In view of these and other changes and modifications which may be made in the construction, arrangement and manner of operating systems embodying my invention it should be understood that the particular form of my invention herein described and shown in the drawing is intended to be illustrative only and is not intended to limit the scope of my invention.

I claim:

1. A liquid dispensing system comprising a plurality of containers for liquid, each having independent means for controlling the delivery of liquid therefrom and independent means for determining the volume of liquid therein, means for measuring the total volume of liquid withdrawn from all of said containers to give an integrated total of the liquid dispensed by said system as well as the individual volume of liquid in each container including a measuring chamber, valve mechanism connected to the inlet of said measuring chamber and being constantly open to insure the flow of a measuring fluid therein to thereby maintain a substantially constant fluid pressure on trapped fluid in said measuring chamber, a wholly closed fluid confining means comprising rigid and unyielding wall structure throughout the system rigidly maintaining a constant volume of trapped fluid at all times providing communication between said measuring chamber and each of said containers, said constant volume of trapped fluid being continuously confined in said system during a measuring operation and having a path of moveent solely between the measuring fluid and the liquid in said containers and movable in response to the discharge of liquid from said containers, insulating means and temperature controlling means for maintaining the liquid and fluids in said system under a substantially constant and predetermined pressure, and means connected to said measuring chamber indicating the amount of measuring fluid in the measuring chamber.

2. The method of arranging the parts of a dispensing system for accurately determining the amount of liquid withdrawn therefrom which comprises the steps of providing a plurality of dispensing containers and liquid in each of such dispensing containers, indicating the amount of liquid dispensed from each container, further providing a measuring chamber and a measuring liquid in such chamber, indicating the total amount of liquid withdrawn from all of the dispensing containers, establishing a wholly closed, rigid and unyielding system of communication between the dispensing containers and measuring chamber, to thereby maintain an unvarying volume throughout said system, trapping a fluid in said unvarying system of communication between and in contact with the measuring liquid in the measuring chamber and the liquid in said containers, controlling the temperature of said trapped fluid to maintain the volume of said trapped fluid constant, providing for free and open communication between a measuring liquid source of supply and the measuring chamber so as to attain a substantially constant flow of such measuring liquid, to thereby maintain a substantially constant liquid pressure on the trapped fluid in the measuring chamber and also replacing measuring liquid in said measuring chamber in an amount equal to the amount of liquid dispensed from said containers.

JOSEPH F. KETTERER.

REFERENCES CITED

The following references are of record in the file of this patent:

UNITED STATES PATENTS

| Number | Name | Date |
| --- | --- | --- |
| 3,725 | Sealy | Aug. 31, 1844 |
| 377,369 | Boggs | Feb. 7, 1888 |
| 1,466,359 | Field | Aug. 28, 1923 |
| 1,735,453 | Dyer | Nov. 12, 1929 |
| 2,113,686 | Gift | Apr. 12, 1938 |
| 2,294,198 | Morrel | Aug. 25, 1942 |

FOREIGN PATENTS

| Number | Country | Date |
| --- | --- | --- |
| 761 of 1865 | Great Britain | Mar. 18, 1865 |
| 15,498 of 1890 | Great Britain | July 25, 1891 |
| 182,602 | Germany | Mar. 19, 1907 |